United States Patent
Lee et al.

(10) Patent No.: US 7,640,585 B2
(45) Date of Patent: Dec. 29, 2009

(54) INTRUSION DETECTION SENSOR DETECTING ATTACKS AGAINST WIRELESS NETWORK AND SYSTEM AND METHOD OF DETECTING WIRELESS NETWORK INTRUSION

(75) Inventors: Sok Joon Lee, Daejeon (KR); Kyung Hee Oh, Seoul (KR); Sin Hyo Kim, Daejeon (KR); Young Hwan Ham, Daejeon (KR); Byung Ho Chung, Daejeon (KR); Kyo Il Chung, Daejeon (KR)

(73) Assignee: Electronics and Telecommunications Research Institute, Daejeon (KR)

(\*) Notice: Subject to any disclaimer, the term of this patent is extended or adjusted under 35 U.S.C. 154(b) by 793 days.

(21) Appl. No.: 11/289,224

(22) Filed: Nov. 29, 2005

(65) Prior Publication Data

US 2006/0150250 A1    Jul. 6, 2006

(30) Foreign Application Priority Data

Dec. 20, 2004    (KR)    ............ 10-2004-0108999

(51) Int. Cl.
G06F 11/00    (2006.01)
(52) U.S. Cl. .................................. 726/22; 726/23
(58) Field of Classification Search ............ 726/2–4, 726/11–15, 22–25; 380/270; 713/150, 153–154, 713/168
See application file for complete search history.

(56) References Cited

U.S. PATENT DOCUMENTS

2002/0083344 A1\* 6/2002 Vairavan ................ 713/201
2003/0217289 A1   11/2003 Ammon et al.
2004/0107219 A1   6/2004 Rosenberger

FOREIGN PATENT DOCUMENTS

KR    10-0341000    6/2002
KR    10-0432168    5/2004

\* cited by examiner

*Primary Examiner*—Hosuk Song
(74) *Attorney, Agent, or Firm*—Ladas & Parry LLP

(57) ABSTRACT

An intrusion detection system and method of a wireless network providing wireless communication to one or more wireless terminal, and an intrusion detection sensor capable of detecting attacks against wireless network are provided. The intrusion detection system of a wireless network includes: an access point providing wireless communication to a wireless terminal; and an intrusion detection sensor examining packets transmitted and received between the access point and a wireless terminal according to a predetermined detection rule. The access point transmits confirmation information on whether or not an event packet, including critical information on whether or not a wireless line connection between the access point and the wireless terminal is established, is transmitted, to the intrusion detection sensor, and the intrusion detection sensor examines an event packet by using the confirmation information. According to the system and method, a variety of attacks occurring on a wireless network can be effectively detected and systematically controlled.

24 Claims, 6 Drawing Sheets

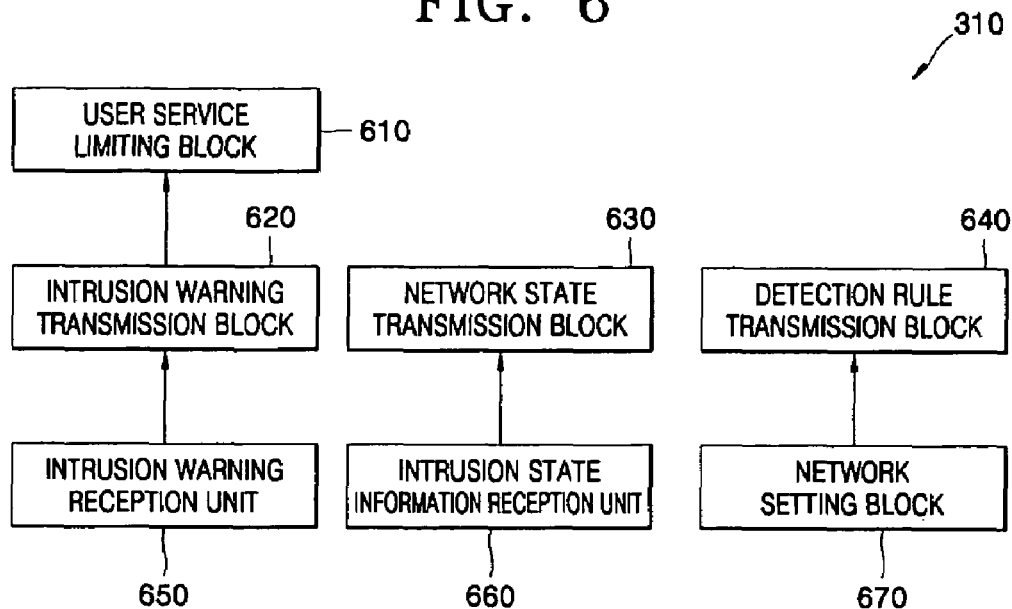
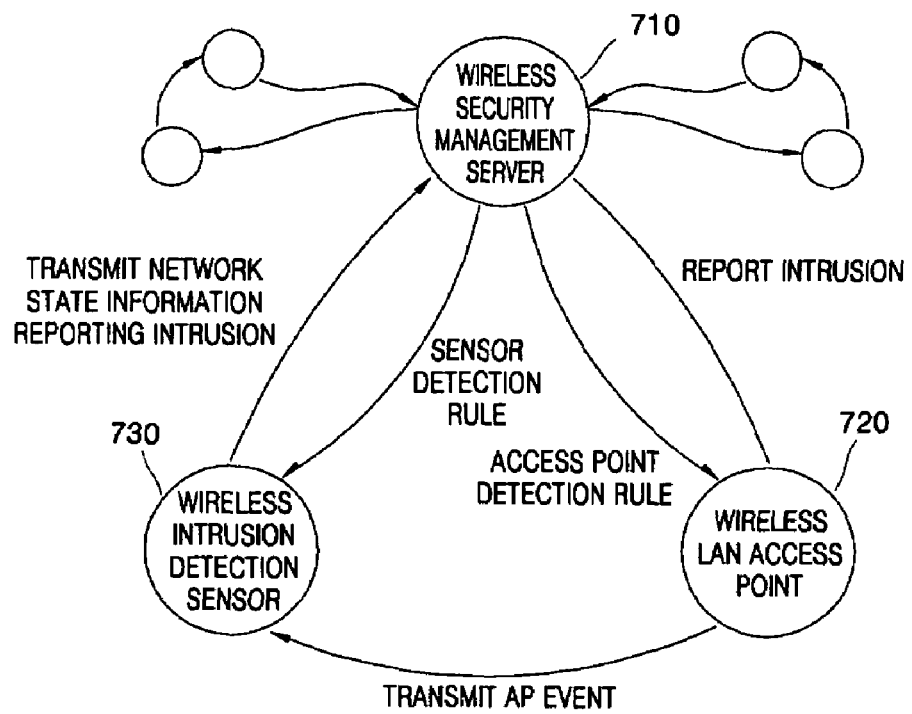

INTRUSION DETECTION SENSOR
DETECTING ATTACKS AGAINST WIRELESS
NETWORK AND SYSTEM AND METHOD OF
DETECTING WIRELESS NETWORK
INTRUSION

CROSS-REFERENCE TO RELATED PATENT
APPLICATIONS

This application claims the benefit of Korean Patent Application No. 10-2004-0108999, filed on Dec. 20, 2004, in the Korean Intellectual Property Office, the disclosure of which is incorporated herein in its entirety by reference.

BACKGROUND OF THE INVENTION

1. Field of the Invention

The present invention relates to a wireless network, and more particularly, to an intrusion detection sensor with a function for detecting a variety of intrusions, second-layer denial of service attacks, and rogue access point attacks that can occur in a public network wireless LAN or an enterprise wireless LAN network, and an intrusion detection method therefor.

2. Description of the Related Art

The wire Internet allows easy access to a destination computer through a common technology, called a TCP/IP protocol, around the world and makes data communication easier. Also, a variety of applications, such as file exchange, web service, and online game, are enabled on the Internet. These advantages of the Internet are maximized by commercialization of a wireless network.

Currently, most of products used for wireless networks comply with an IEEE 802.11b standard formulated by the Institute of Electrical and Electronics Engineers (IEEE). Wireless LAN products complying with the IEEE 802.11b standard use a frequency band of 2.4 GHz and employ a direct sequence spread spectrum (DSSS) method in the physical layer (PHY). As a protocol in the data link layer, IEEE 802.11 is complied with and as an authentication and security standard, IEEE 802.11 is also complied with. Recently introduced products complying with an IEEE 802.11a standard and an IEEE 802.11g standard employ the same protocol in the data link layer as that of the IEEE 802.11 though the physical layers are different. In the IEEE 802.11a standard, a frequency band of 5.2 GHz or 5.8 GHz is used, and an orthogonal frequency division multiplexing (OFDM) method is employed in the physical layer. The IEEE 802.11g employs the OFDM method in a 2.4 GHz frequency band.

A wireless LAN is broken down roughly into two components: one is an access point (AP) and the other is a wireless network interface card (WNIC). The access point is an apparatus connected to a wire network and playing a role of relaying traffic of wireless users. The WNIC is an apparatus for network interface from a wireless terminal to an access point.

However, there are people who try to profiteer by making bad use of this development of wire and wireless networks and maliciously utilizing or breaking other's information. Also, these people tried to achieve their goals by using the weak points of the TCP/IP protocol or upper-layer protocols. As examples for this, there are a variety of viruses, Trojan horse attacks, and distributed denial of service attacks. Accordingly, in order to protect a subnetwork or a host computer from these attacks, security systems, such as a firewall, an intrusion detection system, and an intrusion protection system, have been introduced. Network administrators of each company watch network flows in and out of the network and prepare against a variety of attacks, by using these systems.

However, the network security problem is much more serious in a wireless network than in a wire network. The reason is that the conventional enterprise network or the Internet is formed all with wire connections, and in order to access the network, an intrusion position should be secured physically. Meanwhile, in case of a wireless network, sniffing and an intrusion attack can be performed any place within a distance that radio waves can reach. Also, in the wireless LAN there are packets for which encryption and authentication are impossible, and these packets can be forged without limit. These packets include 802.11 administration frames, and an extensible authentication protocol (EAP) on LAN (EAPOL) packets before authentication is performed. An attack by an authenticated user is also possible. Accordingly, it is not easy to apply a security policy that is applied to the conventional Internet connection network, to a wireless network.

In order to guarantee the security of a wireless network, there are IEEE 802.1x that is an access control standard through user authentication, Wi-Fi protected access (WPA) to guarantee secrecy and integrity on a wireless connection, and IEEE 802.11i. Nevertheless, new types of attacks that an intrusion detection system used in the conventional wire networks cannot detect with ease have been emerging. Some examples of these attacks are as the following.

FIG. 1 illustrates a second-layer denial of service attack occurring in a conventional wireless network.

In FIG. 1, an authorized terminal 120 is normally connected to a wireless LAN access point 110. AT this time, an attacker 130 analyzes a packet on a wireless network and finds the media access control (MAC) addresses of the authorized terminal 120 and access point 110 currently connected. Then, by forging a disassociation message that is a message to disassociate a connection, among 802.11 management frames, the attacker 130 transmits the message to the authorized terminal 120 as if the message is transmitted by the access point 110 to the authorized terminal 120. Then, the authorized terminal 120 is disconnected and if the disassociation message is continuously received, this terminal 120 cannot establish a connection to the access point 110.

FIG. 2 illustrates an address resolution protocol (ARP) poisoning attack occurring in a conventional wireless network.

In FIG. 2, a first authorized terminal 220, a second authorized terminal 230, and an attacker 240 are normally authenticated and connected to a wireless LAN access point 210. Though the first authorized terminal 220 does not send an ARP request message, the attacker 240 transmits an ARP response message formed with a pair of (the IP address of the second authorized terminal, the MAC address of the attacker). If there is TCP/IP data that the first authorized terminal 220 desires to transmit to the second authorized terminal 230, the first authorized terminal 220 refers to its address table, and in this case, the first authorized terminal 220 mistakes the MAC address of the attacker 240 for the MAC address corresponding to the IP address of the second authorized terminal 230, and transmits the data to the attacker 240. When wireless data is not encrypted, the attacker 240 can monitor the wireless data and ultimately find all data transmitted by the first authorized terminal 220 to the second authorized terminal 230. However, when encryption of wireless data is performed by a dynamic key allocation method on a wireless LAN network to which the WPA or IEEE 802.11i standard is applied, the attacker 240 cannot find the data. Accordingly, through the ARP poisoning attack performed as described above with reference to FIG. 2, data to be transmitted to another terminal can be monitored and modified in the middle.

The second-layer denial of service attack shown in FIG. 1 cannot be detected because a wire intrusion detection system generally analyzes frame of third or higher layers. The ARP poisoning attack on the wireless LAN is a third-layer attack, but detection of the attack is impossible because the wire intrusion detection system analyzes only wire frames.

In addition to the attacks shown in FIGS. 1 and 2, there are a variety of attacks that cannot be detected by the conventional wire intrusion detection system on a wireless LAN network, such as a rogue access point attack, an attack based on 802.11i message integrity code (MIC) failure, a denial of service attack using the characteristic of the 802.11f protocol.

Accordingly, a technology enabling detection of a variety of attacks occurring on a wireless network is much needed.

SUMMARY OF THE INVENTION

The present invention provides a method and system capable of detecting a type of attack that cannot be detected by a conventional wire intrusion detection system, and allowing an administrator to deal with the attack.

The present invention also provides an intrusion detection method and system capable of collecting and analyzing all packets wirelessly transmitted and received in a second-layer that is a lower layer than a transfer control protocol/Internet protocol (TCP/IP) layer, and capable of detecting attacks in a third or higher layer in relation to packets transmitted in a range that the conventional wire intrusion detection system cannot collect, and if possible, finding a user causing attacks and limiting services to the user.

The present invention also provides an intrusion detection method and system capable of monitoring and managing easily at a central point, many distributed access points, intrusion detection sensors, and a wireless LAN network managed by access points, by using a wireless security management server.

According to an aspect of the present invention, there is provided an intrusion detection sensor detecting an attack against a wireless network including an access point providing wireless communication to one or more wireless terminals, wherein the intrusion detection sensor examines a packet transmitted and received between the access point and the wireless terminal according to a predetermined detection rule, and in relation to an event packet including critical information on whether or not a wireless line connection between the access point and the wireless terminal is established, the packet is examined by additionally using confirmation information received from the access point on whether or not the event packet is transmitted.

The event packet may be any one of an 802.11 disassociation packet, a deauthentication packet, and an extensible authentication protocol (EAP)-failure packet transmitted by the access point to the wireless terminal.

When the access point transmits the event packet to the wireless terminal, the confirmation information may be transferred, by transmitting the intention, or the event packet itself to the intrusion detection sensor.

The confirmation information may be transmitted through a secure communication channel between the access point and the intrusion detection sensor.

The secure communication channel may be implemented by using any one of an inter access point protocol (IAPP), an Internet protocol security protocol (IPSec), and a transport layer security (TLS) protocol.

According to another aspect of the present invention, there is provided a wireless network intrusion detection system providing wireless communication to one or more wireless terminal, the system including: an access point providing wireless communication to the wireless terminal; and an intrusion detection sensor examining packets transmitted and received between the access point and a wireless terminal according to a predetermined detection rule, wherein the access point transmits confirmation information on whether or not an event packet, including critical information on whether or not a wireless line connection between the access point and the wireless terminal is established, is transmitted, to the intrusion detection sensor, and the intrusion detection sensor examines an event packet by using the confirmation information.

The intrusion detection sensor may detect any one of a rogue access point attack, and a man-in-the-middle attack, by using the detection rule.

The access point may detect any one of an address resolution protocol (ARP) poisoning attack, an 802.11i message integrity code (MIC) failure attack, and a denial of service attack using the characteristic of an 802.11f protocol, by using the detection rule.

The system may further include a wireless security management server monitoring the security situation of distributed networks including a plurality of access points, and transmitting the detection rule to the intrusion detection sensor and the access point.

According to still another aspect of the present invention, there is provided a wireless network intrusion detection method providing wireless communication to one or more wireless terminal, the method including: examining ordinary packets transmitted and received between an access point providing wireless communication to the wireless terminal and the wireless terminal, according to a predetermined detection rule; identifying an event packet, including critical information on whether or not a wireless line connection between the access point and the wireless terminal is established, among the ordinary packets; if the event packet is identified, receiving confirmation information from the access point on whether or not the event packet is transmitted; and examining the event packet by using the confirmation information.

The event packet may be any one of an 802.11 disassociation packet, a deauthentication packet, and an extensible authentication protocol (EAP)-failure packet transmitted by the access point to the wireless terminal.

When the access point transmits the event packet to the wireless terminal, the confirmation information may be transferred, by transmitting the intention, or the event packet itself to the intrusion detection sensor.

According to the present invention, a variety of attacks occurring on a wireless network can be effectively detected and systematically controlled.

BRIEF DESCRIPTION OF THE DRAWINGS

The above and other features and advantages of the present invention will become more apparent by describing in detail exemplary embodiments thereof with reference to the attached drawings in which:

FIG. 6 is a block diagram explaining the operation of a wireless security management server operating on a wireless network intrusion detection system according to a preferred embodiment of the present invention;

FIG. 7 illustrates a wireless network intrusion detection method according to another preferred embodiment of the present invention;

DETAILED DESCRIPTION OF THE INVENTION

Figure 1:
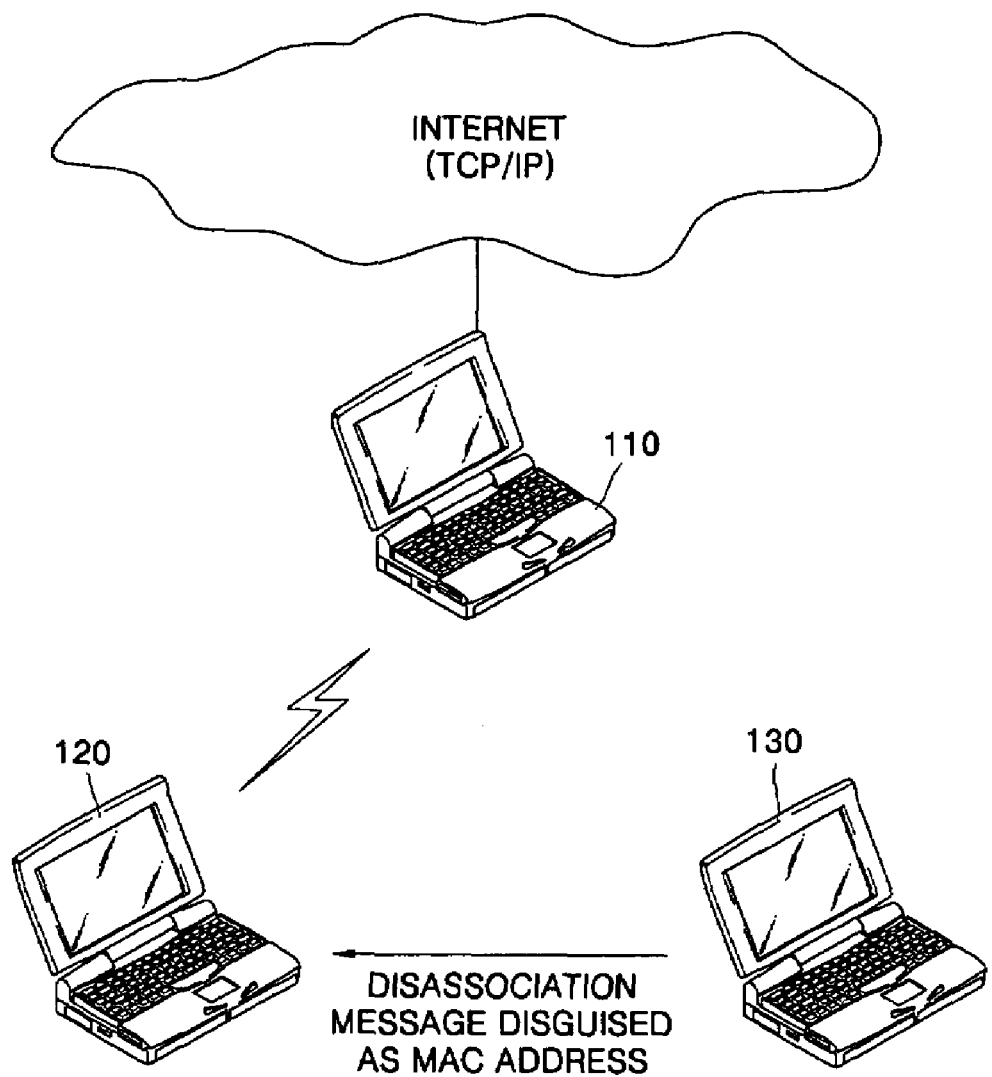
FIG. 1 illustrates a second-layer denial of service attack occurring in a conventional wireless network.
Figure 2:
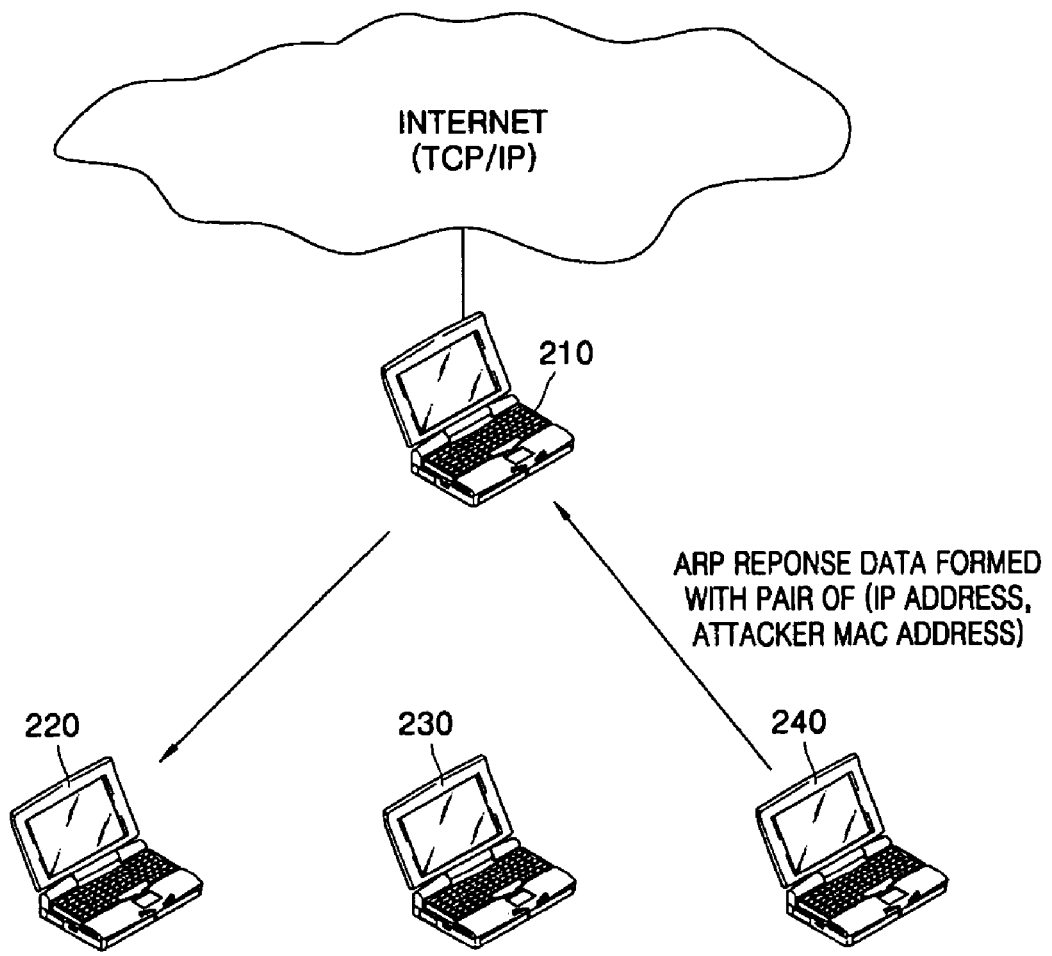
FIG. 2 illustrates an ARP poisoning attack occurring in a conventional wireless network.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings.

In the drawings, whenever the same element reappears in subsequent drawings, it is denoted by the same reference numeral.

Figure 3:
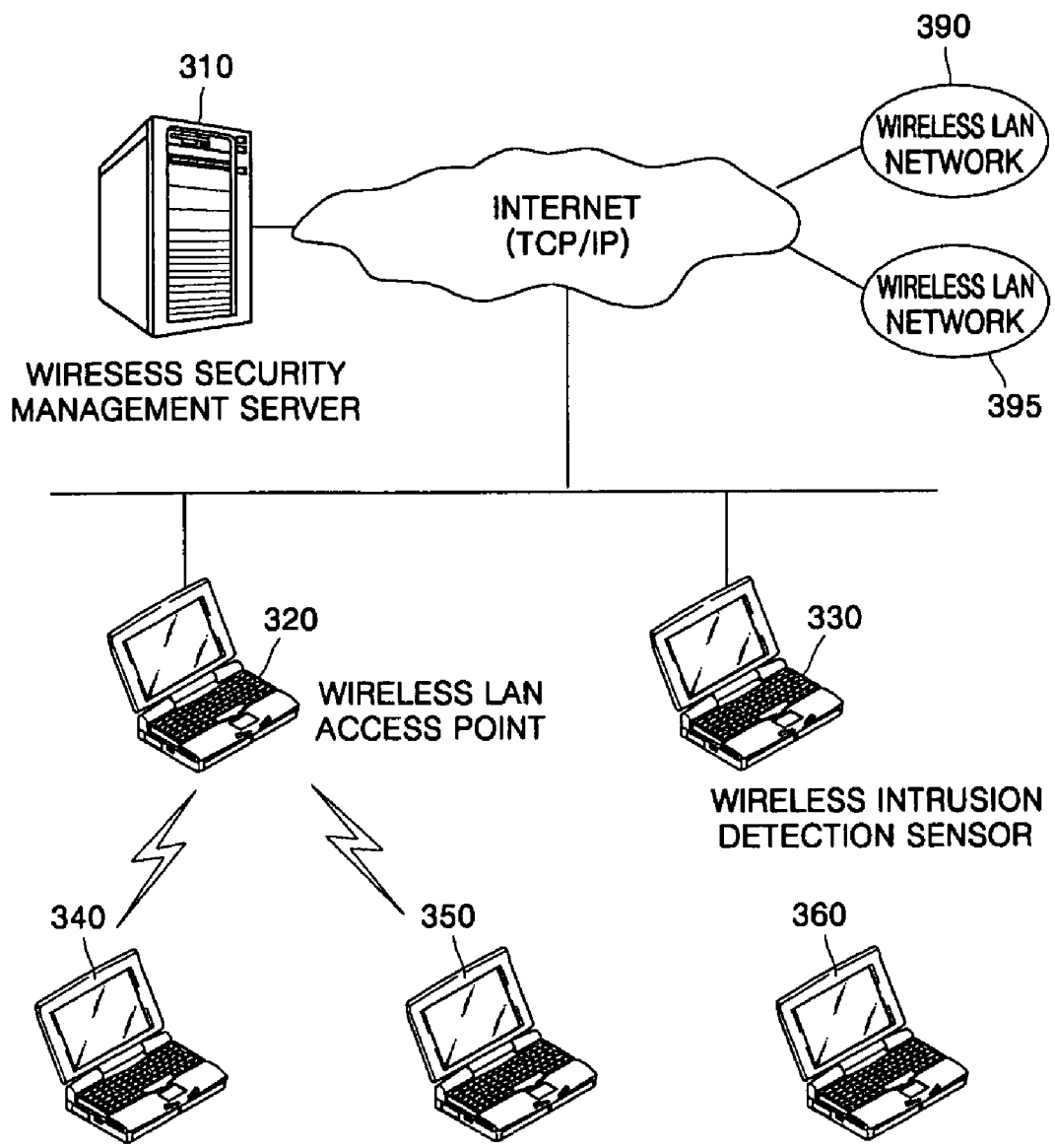
FIG. 3 illustrates a wireless network intrusion detection system according to a preferred embodiment of the present invention.

FIG. 3 illustrates a wireless network intrusion detection system according to a preferred embodiment of the present invention.

The wireless network intrusion detection system shown in FIG. 3 includes a wireless security management server 310, a wireless LAN access point 320, and a wireless intrusion detection sensor 330. Also, with respect to the state and environment of a wireless network, a plurality of authorized wireless terminals 340 and 350 and one or more attackers 360 may be further included.

The authorized wireless terminals 340 and 350 are terminals that have rights to use the wireless network and are authenticated. The wireless terminal 340 and 350 include portable apparatuses that can access a wireless LAN in general, such as a computer and a personal digital assistant (PDA). A user accesses a network through a wireless LAN access point 320 by using a method, such as a user authentication process or MAC address authentication. The process for the authorized wireless terminals 340 and 350 to access a network through a wireless LAN access point and functions required for the process are the same as in an ordinary wireless LAN access point.

The attacker 360 of FIG. 3 is an attacker trying a variety of attacks fit for the characteristic of a wireless LAN. This attacker 360 may be an illegal intruder that cannot access a wireless LAN network, or may also be a user planning to attack the authorized terminals 340 and 350 of the intranet, while normally receiving services after being authenticated.

In order to enable the system to detect and deal with the attacker's trial of those attacks, an intrusion detection module is included inside the wireless LAN access point 320, and as a separate device, a wireless intrusion detection sensor 330 is provided to correspond to the wireless LAN access point 320. A communication channel can be used between the access point 320 and the intrusion detection sensor 330 in order to more easily detect an intrusion.

Unlike an ordinary wireless LAN access point, the wireless LAN access point 320 includes an intrusion detection module internally, and senses an attack from the attacker 360 according to a detection rule received from the wireless security management server 310. Examples of intrusion types that the wireless LAN access point 320 desires to detect include the ARP poisoning attack, the IEEE 802.11i MIC failure attack, and the 802.11f denial of service attack. These attacks include attacks that the wireless intrusion detection sensor 330 cannot easily analyze because wireless data between the user terminals 340 and 350 and the access point 320 is encrypted in an environment to which the WPA or IEEE 802.11i is applied. The operation of the access point 320 will be explained in detail later with reference to FIG. 4.

Also, the intrusion detection sensor 330 examines packets transmitted and received between the access point 320 and the wireless terminal 340 according to a predetermined detection rule. By sensing packets between the access point 320 and the wireless terminal 340 externally, the intrusion detection sensor 330 can sense attacks that the access point 320 cannot easily sense by using an intrusion detection module. That is, in relation to an event packet, including critical information on whether or not a wireless line is connected, among data packets transmitted and received between an access point and a wireless terminal, the intrusion detection sensor 330 examines whether or not there is an attack, by additionally using confirmation information on whether or not the access point 320 transmits an event packet to the wireless terminals 340 and 350. This event packet may be an 802.11 disassociation packet, a deauthentication packet, or an authentication failure (EAP-failure) packet. When transmitting an event packet to the wireless terminal 340, the access point 320 may also transmit an identical event packet to the intrusion detection sensor 330 or may transmit to the intrusion detection sensor 330 a message indicating that an event packet is transmitted to the wireless terminal 340. Then, only when the conformation information is received, the intrusion detection sensor 330 determines that the event packet is valid, and if the confirmation information is not received, the intrusion detection sensor 330 can determine that an attack against the access point 320 occurs.

Preferably, the confirmation information transferred to the intrusion detection sensor 330 is transmitted through a secure communication channel between the access point 320 and the intrusion detection sensor 330. As the secure communication channel, one of an inter access point protocol (IAPP), an Internet protocol security protocol (IPSec), a secure socket layer (SSL), and a transport layer security (TLS) protocol can be used.

Some of terminology used in the present specification to explain attacks that can be sensed by the access point 320 and the intrusion detection sensor 330 will now be explained.

The IEEE 802.11 is a representative standard among wireless LAN standards, and is a standard designed so that data communication similar to that of 802.3 can be available also in wireless communication. On the IEEE 802.11 protocol, an Internet protocol may exist.

The IEEE 802.1x is a standard designed to control user authentication and service access, by using the EAP on LAN (EAPOL), as IEEE 802 family networks (802.3, 802.11, 802.15, etc.) may require user authentication. Strictly speaking, the IEEE 802.1x is not a wireless LAN standard, but is used in most of wireless LAN public network services.

The IEEE 802.11i is a standard designed to enable message encryption and integrity, by partially modifying the IEEE 802.11 MAC layer, as it was pointed out that the conventional IEEE 802.11 standard has much problem in security.

The IEEE 802.11 is a standard for a protocol and a message that is transmitted and received between access points so that a wireless terminal can travel among access points in the conventional IEEE 802.11 standard. The protocol transmitted between access points in the IEEE 802.11f is referred to as an inter access point protocol (IAPP).

Some of a variety of attacks that can be performed by the attacker 360 will now be explained, and many attacks known or unknown may exist in addition to these attacks.

Second Layer Denial of Service Attack

The conventional detection technology for the second layer denial of service attack uses an individual detection sensor. However, in the intrusion detection system according to the present invention as described above, the access point 320 and the intrusion detection sensor 330 enhance the attack sensing performance through interactions. That is, when the access point 320 generates an event packet, confirmation information corresponding to it is transferred to the intrusion detection sensor 330. By using the confirmation information, the intrusion detection sensor 330 senses the second layer denial of service attack.

ARP Poisoning Attack

The address resolution protocol (ARP) is a protocol used for dynamic mapping of a third layer network address to a MAC address. The ARP poisoning is to insert a nonexistent ARP address or incorrect ARP address into an ARP cache of a system.

In case of the conventional wire LAN, there are detection methods, but in case of a wireless LAN, it is difficult to detect the ARP poisoning attack. The reason is that in case of the ARP poisoning attack delivered on a wireless LAN, a detection rule should exist in the access point 320 on a moving path of an attack-related packet because both the wireless terminals 340 and 350 being attacked and the attacker 360 perform wireless communication.

The access point 320 according to the present invention has a detection module internally, and can sense the ARP poisoning attack by using a detection rule received from the wireless security management server 310. In addition, in case of a wireless LAN network based on 802.1x user authentication, a user making an attack can be identified.

Rogue Access Point Attack

In this attack, the attacker 360 is pretending to provide a normal service as an access point, by forging an 802.11 beacon frame indicating that an access point exists.

The rogue access point attack includes a fake access point attack transmitting only a beacon frame to cause a disorder, and an unregistered access point attack actually being connected to a wire LAN illegally, providing an Internet service, and intercepting user information in the middle of the process.

In the intrusion detection system according to the present invention, preferably, the intrusion detection sensor 330 compares a beacon frame with an authorized access point list kept in the intrusion detection sensor 330 or received from the wireless security management server 310.

802.11i Message Integrity Code (MIC) Failure Based Attack

This attack can be made only in an 802.11i environment. An attacker establishes a connection through user authentication such as 1x, and then intentionally causes the 802.11i MIC failure.

The MIC is a code to prove message integrity, and if two or more errors occur in one minute in this code, the access point 320 terminates connections of all wireless terminals 340 and 350 connected to the access point 320. By using this characteristic, the malicious attacker 360 can make an attack causing the MIC failure intentionally. In this case, the attacker 360 should pass normal user authentication.

In the intrusion detection system according to the present invention, preferably, the detection module in the access point 320 senses this attack. In addition to detect this attack, in the intrusion detection system according to the present invention, when this attack is detected, the detection is transferred to the wireless security management server 310 such that access service of the attacker 360 can be restricted.

Denial of service attack using the characteristic of the 802.11f protocol

In the 802.11f environment, if the wireless terminal 340 and 350 desires to move from a first access point to a second access point, a reassociation or association message is transmitted to the second access point. Then, the second access point notifies this to the first access point so that the current connection between the first access point and the wireless terminal can be terminated. In this attack, by using the characteristic of the 802.11f environment, the attacker forges the MAC address of the wireless terminal connected to the first access point and transmits a reassociation or association frame to the second access point. Then, the connection between the first access point and the wireless terminal is disconnected illegally.

Denial of Terminal Service Attack Using EAPOL Authentication

The EAPOL attack is broken down into two types. In an EAPOL-failure attack, an attacker transmits a disguise frame as if an access point transmits to a wireless terminal an EAP-failure message indicating that authentication is failed when a user desires to be authenticated through the 802.1x. Also, in an EAPOL-logoff attack, the attacker forges an EAPOL-logoff frame indicating that a user is going to finish a user authentication session.

In the present invention, the presence of this attack is detected by transmission and reception of an event packet and confirmation information between the intrusion detection sensor 330 and the access point 320, and therefore detection accuracy can be enhanced.

Man-in-the-Middle Attack Using a Second Layer

This is an attack similar to the rogue access point attack. That is, an attacker not connected to a wire network transfers a packet that is transmitted by the wireless terminal 340 when authentication is performed, and transfers again a packet transferred by the access point 320, to the wireless terminal 340 without change so that the attacker can intercept the information in the middle of the process.

In the present invention, preferably, the intrusion detection sensor 330 detects this attack as the rogue access point attack.

Session Intercept Attack

An attacker transmits a forged deauthentication or disassociation frame as if the frame is transmitted by the access point 320, to the wireless terminal 340 and 350, which is connected to the access point 320 after normally authenticated, so that the terminal 340 and 350 takes the connection as disconnected, and the access point 320 does not know that the connection is disconnected.

In this process, the attacker 360 intercepts the connection session instead. The attacker 360 forges the MAC address of the wireless terminal 340 and 350 to try the session intercept attack.

In the present invention, the session intercept attack is sensed by the interaction between the access point 320 and the intrusion detection sensor 330 in a manner similar to that for the second layer denial of service attack.

In the conventional technology, it is difficult to determine the presence of the attack, but in the present invention, by using an event packet and confirmation information, a deauthentication or disassociation packet is received directly from the access point 320 such that the sensing accuracy is enhanced.

Figure 4:
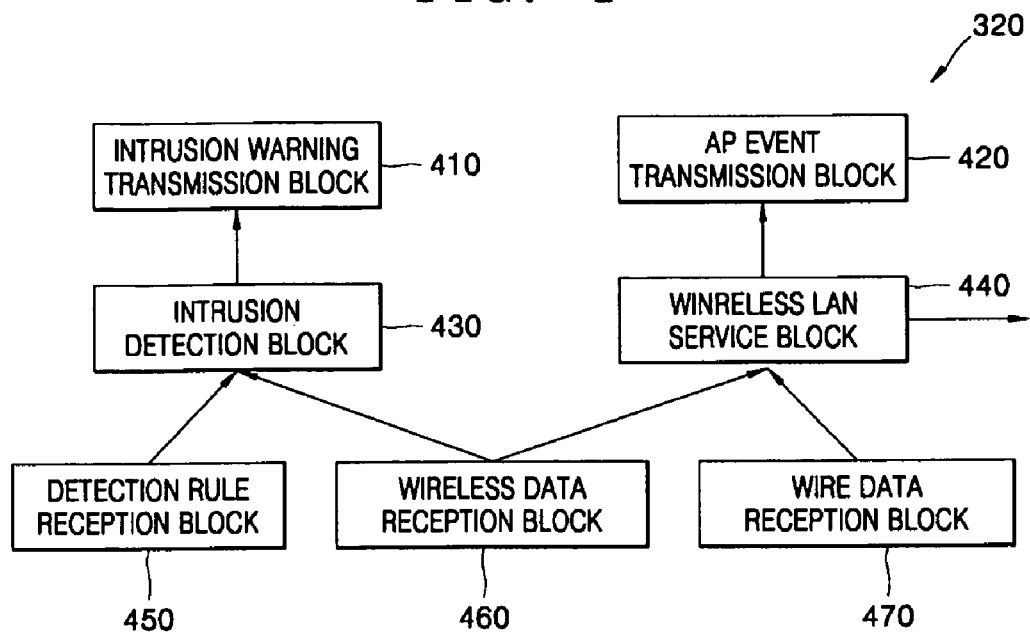
FIG. 4 is a block diagram explaining the operation of an access point operating on a wireless network intrusion detection system according to a preferred embodiment of the present invention.

FIG. 4 is a block diagram explaining the operation of an access point operating on a wireless network intrusion detection system according to a preferred embodiment of the present invention.

The wireless LAN access point 320 receives an intrusion detection rule from the wireless security management server 310 through a detection rule reception block 450, and based on this, transmits part of wireless data received from the wireless data reception block 460, to an intrusion detection block 430. Here, if an intrusion is detected, the occurrence of the intrusion is warned to the wireless security management server 310 by the intrusion warning transmission block 410. As a basic service of a wireless LAN access point, a wireless LAN service function is provided through a wireless service block 440, the wireless data reception block 460, and a wire data reception block 470. If an event sensitive to an intrusion, such as a 802.11 disassociation and an EAP-failure message, occurs here, an AP event transmission block 420 performs a function for loading this event on an event packet and transmitting the packet to the wireless intrusion detection sensor 330.

The detection rule (an access point detection rule, and a sensor detection rule) in the present specification means a detection rule that is applied so that malicious attacks can be detected in an access point or an intrusion detection sensor. This is a concept similar to a virus vaccine engine, and the access point 320 and the intrusion detection sensor 330 receive inputs of all frames detected in a wireless LAN network, and examine all received frame by using the detection rule. In a wire network an 'intrusion protection system (IPS)' to detect an unknown attack has been introduced. Also, in the intrusion detection system according to the present invention, preferably, unknown attacks are detected by using known detection rules. The detection rule is not fixed in the access point 320 or the intrusion detection sensor 330, but is transmitted by the wireless security management server 310. Accordingly, when an attack with a new technique is known, the system can be upgraded so that the access point 320 and the intrusion detection sensor 330 can detect this attack easily.

Figure 5:
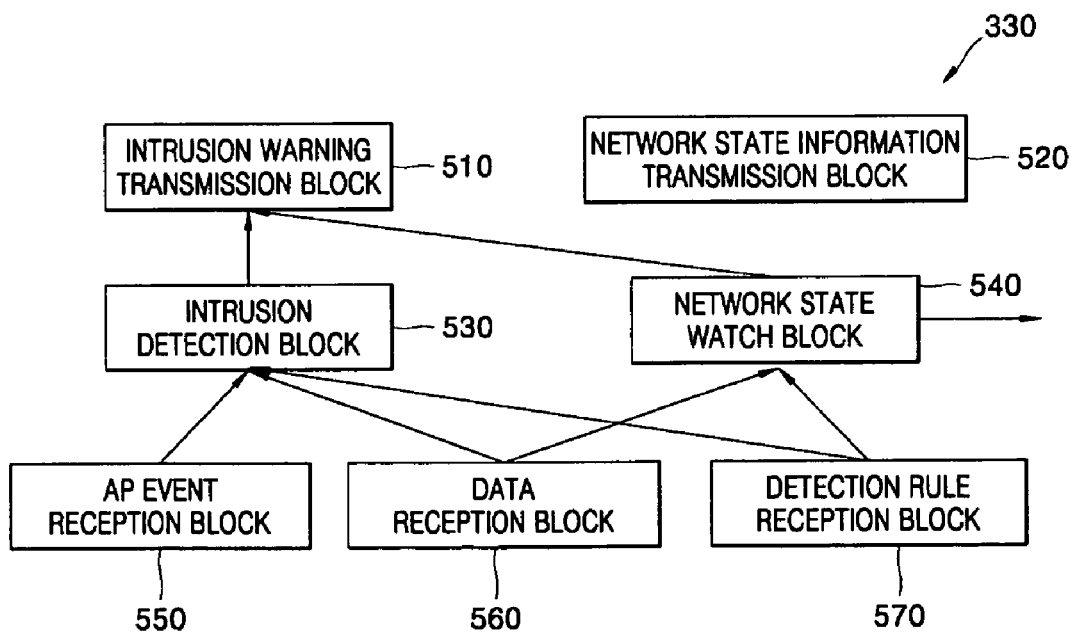
FIG. 5 is a block diagram explaining the operation of an intrusion detection sensor operating on a wireless network intrusion detection system according to another preferred embodiment of the present invention.

FIG. 5 is a block diagram explaining the operation of an intrusion detection sensor operating on a wireless network intrusion detection system according to another preferred embodiment of the present invention.

The wireless intrusion detection sensor 330 receives an intrusion detection rule from the wireless security management server 310 through a detection rule reception block 570, and based on this, monitors through a data collection block 560. Also, by using the monitored result, the intrusion detection sensor 330 stores network state information in a network state monitoring block 540 and at the same time detects the presence of intrusion through an intrusion detection block 530. At this time, if an intrusion occurs, the occurrence of the intrusion is warned to the wireless security management server 310 through an intrusion warning transmission block 510, and if the wireless security management server 310 requests network state information, the information is transmitted through a network state information transmission block 520. Also provided is an access point event reception block 550 receiving an 802.11 disassociation, or EAP-failure message in order to determine a second layer denial of service attack more accurately.

The wireless intrusion detection sensor 330 is a dedicated function for monitoring wireless LAN packets, detecting the presence of intrusion, and watching the network state. Examples of intrusion types that the wireless intrusion detection sensor 330 desires to detect include an 802.11 denial of management frame service attack, a denial of service attack using an authentication frame, a rogue access point attack, and a session intercept attack. It is difficult for a wireless LAN access point to detect these attacks, because the wireless LAN access point has a device driver designed to receive only a packet with a destination being the wireless LAN access point, and it is impossible for the wireless LAN access point to actively detect a fake packet, a rogue access point, and the like.

FIG. 6 is a block diagram explaining the operation of a wireless security management server operating on a wireless network intrusion detection system according to a preferred embodiment of the present invention.

FIG. 6 shows an internal structure of the wireless security management server that can confirm at the center of the system an intrusion warning and network state information received from the wireless LAN access point 320 and the wireless intrusion detection sensors 330 and can manage network devices. Through a network setting block 670, the network devices are managed and a detection rule is set. Then, the wireless security management server 310 transmits the detection rule to the access point 320 and the intrusion detection sensor 330 through a detection rule transmission block 640. According to the detection rule, the wireless LAN access point 320 and the wireless intrusion detection sensors 330 sense an attack and transmit an intrusion warning to the wireless security management server 310. Then, the intrusion warning reception block 650 of the wireless security management server 310 receives the intrusion warning and reports to an administrator through an intrusion warning transmission block 620. In this case, preferably, the wireless security management server 310 leaves a log for managing intrusion statistics. Also, when an unauthorized act of a registered user is found, the service to the attacking user can be restricted by a user service limiting block 610.

The wireless security management server 310 includes a network state information collection block 660 and a network state transmission block 630 so that in addition to the intrusion warning, situations of respective distributed networks can be monitored at the center of the system. Here, not simply recorded without change, the received network state information transmitted by the wireless intrusion detection sensor 330 can be modified into contents, including how wireless packets flowed between terminals, access points, and rogue access points in each time band, and how connections were established and terminated, and stored.

FIG. 7 illustrates a wireless network intrusion detection method according to another preferred embodiment of the present invention.

The intrusion detection method of the wireless network will now be explained. First, a packet transmitted and received between an access point 720 providing wireless communication to a wireless terminal and the wireless terminal is examined. A detection rule to be used is transmitted from a wireless security management server 710 to an intrusion detection sensor 730 and the access point 720. Then, the intrusion detection sensor 730 and the access point 720 examines ordinary packets by using the received detection rule.

At this time, it is identified whether or not an event packet, including critical information on whether or not a wireless line connection between the access point 720 and the wireless terminal is established is transmitted among the ordinary packets. If the event packet is identified, confirmation information on whether or not the event packet is transmitted by the access point 720 is received. By doing so, the intrusion detection sensor 730 examines the event packet by using the received confirmation information.

The operations with the wireless LAN access point 720, the wireless intrusion detection sensor 730, and the wireless security management server 710 are performed by using the interface shown in FIG. 7. In FIG. 7, the wireless security management server 710 transmits to the wireless LAN access point 730 and the wireless intrusion detection sensor 720, respective detection rules. Then, the wireless LAN access point 720 and the wireless intrusion detection sensor 730 sense a network attack by using the received respective rules. In this case, attacks against the event packet, including critical information on the termination of a connection between the access point 720 and the intrusion detection sensor 730, can be effectively sensed by the interaction between the access point 720 and the intrusion detection sensor 730 as described above. Also, the wireless intrusion detection sensor 730 transmits network state information together so that the administrator can easily identify the network situation.

Figure 8:
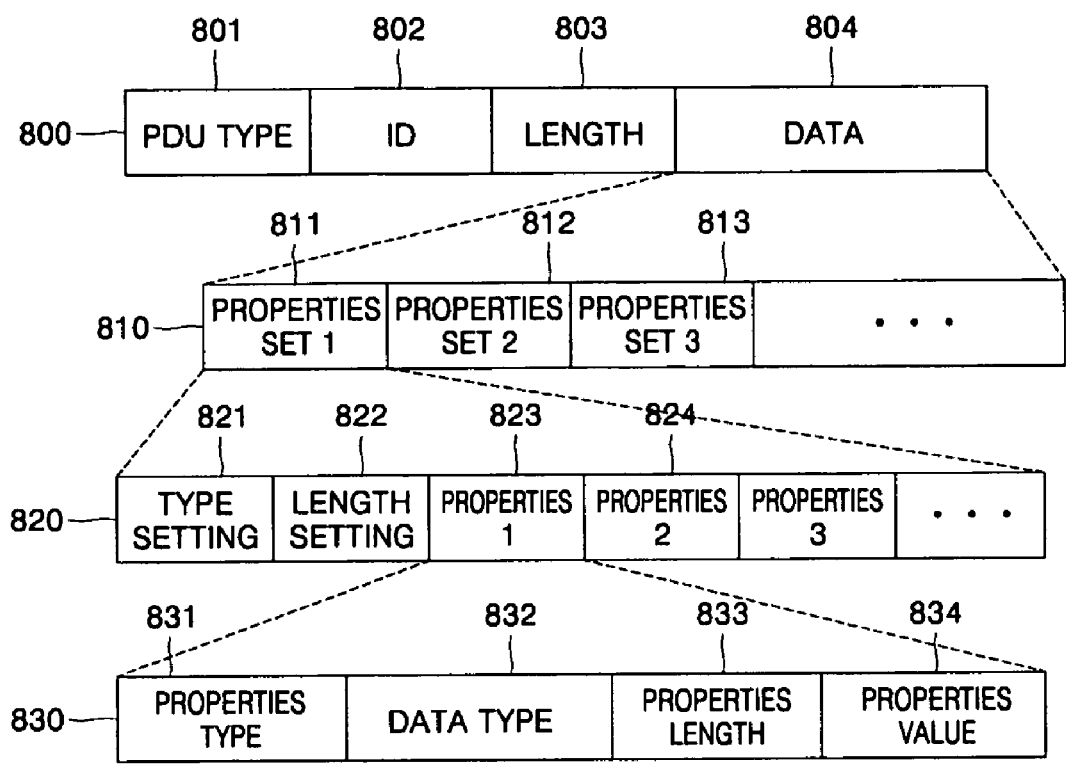
FIG. 8 illustrates the structure of a protocol packet transmitted and received among an access point, an intrusion detection sensor, and a wireless security management server included in a wireless network intrusion detection system according to a preferred embodiment of the present invention.

FIG. 8 illustrates the structure of a protocol packet transmitted and received among an access point, an intrusion detection sensor, and a wireless security management server included in a wireless network intrusion detection system according to a preferred embodiment of the present invention.

By using the protocol shown in FIG. 8, a detection rule, an intrusion report, and network state information can be transmitted.

In a protocol data unit (PDU) type 801, GET to obtain information on each network state, SET to set a detection rule, and ALARM to warn intrusion may be included. Also, the PDU type 801 is made to include a plurality of properties set 820 internally. In the properties set 820, a type setting 821 according to the PDU type 801 is included so that the type of the setting and the type of an attack in relation to a report can be expressed. The properties set 820 includes a plurality of properties 830 internally and an actual data value is included here. For example, if the type of a rogue access point attack is set in the properties set, internally included properties may include a variety of values, respectively, such as a service set identifier (SSID) value of the rogue access point, a MAC address, the number of packets, the first transmission time, and the last transmission time.

Figure 9:
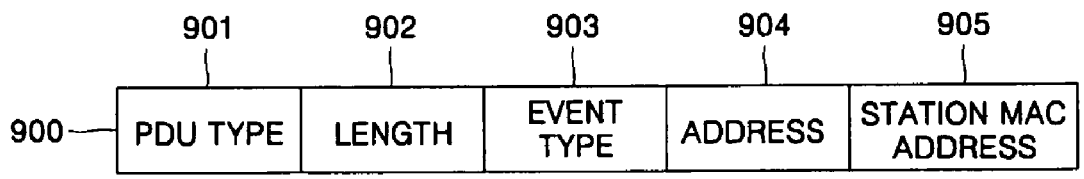
FIG. 9 illustrates the structure of a protocol packet transmitted and received between an access point and an intrusion detection sensor in a wireless network intrusion detection system according to a preferred embodiment of the present invention.

FIG. 9 illustrates the structure of a protocol packet transmitted and received between an access point and an intrusion detection sensor in a wireless network intrusion detection system according to a preferred embodiment of the present invention.

As described above, the access point event protocol can be used to enhance the accuracy of detection. For example, it is assumed that in order to detect a denial of service attach using the second layer 802.11 management frame, the wireless intrusion detection sensor 720 receives a disassociation message transmitted by the wireless LAN access point 730 to a predetermined terminal. If an event indicating that this message is directly transmitted by the wireless LAN access point 730 is received through the access point event protocol, this message proves to have nothing to do with a denial of service attack. However, if the event indicating that this message is transmitted by the wireless LAN access point 730 is not received in a reasonable time, the message can be confirmed as a denial of service attack.

For the AP event protocol in the present invention, an IAPP protocol included in the 802.11f standard can be used. If authentication is performed only between the wireless intrusion detection sensor 720 and the wireless LAN access point, it can be implemented on the protocols, such as the Internet protocol security protocol (IPSec), the secure socket layer (SSL) and the transport layer security (TLS).

Examples of events that can be transferred through the event protocol are as follows, and the event should be one that an access point can confirm. For example, if the access point receives an 802.11 disassociation packet from a terminal, there is no way to confirm that the packet is transmitted by an authorized terminal or a forged packet sent by an attacker as if the packet is transmitted by an authorized terminal. Accordingly, this event cannot be used in the access point event protocol.

An event in which an access point transmits an 802.11 disassociation packet to a wireless terminal.

An event in which a wireless terminal transmits an 802.11 deauthentication packet to a wireless terminal.

An event in which an access point transmits an EAP-failure packet to a wireless terminal.

In the present specification, the IPSec means a standard proposed for security of a network or a packet processing layer of network communication. The IPSec essentially provides two types of security services, including an authentication header (AH) permitting authentication of a data transmitter, and encapsulating security payload (ESP) supporting authentication of a transmitter and data encryption. Detailed information in relation to each of these services is inserted in a packet in a header following an IP packet header. The major advantage of the IPSec is that without changing individual user computers, preparation for security can be processed.

Meanwhile, the SSL is a security technology developed to solve a problem that the Internet protocol cannot keep secrecy in the aspect of security, and is a protocol that is most widely used to maintain security of personal information and credit card information required when commercial transactions are performs on the Internet. The TLS is made to provide protection of privacy and integrity of data between two communication application programs, and is formed with a TLS record protocol and a TLS handshake protocol. The TLS record protocol resides immediately above the TCP layer, provides security when a communication connection between hosts is established, and provides privacy and reliability service. The TLS record protocol is used to encapsulate an upper layer protocol. The TLS handshake protocol allows a server and a client to authenticate each other before data is transmitted, and to negotiate an encryption algorithm and encryption key to be used.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention, a registration access point and an intrusion detection sensor detect and classify attacks using the weakness of a wireless LAN, through packet information collected internally, and warn these to the administrator so that the administrator can quickly deal with these attacks.

Also, according to the present invention, provided are a method and system capable of detecting those types of attacks that can reside on a wireless LAN network and cannot be detected by the conventional wire intrusion detection system, and allowing the administrator to deal with the attacks.

Furthermore, according to the present invention, provided are an intrusion detection method and system capable of collecting and analyzing all packets transmitted and received through wireless communication at the second layer that is a lower layer than the TCP/IP protocol, and in relation to packets that are transmitted in a range that cannot be collected by a wire intrusion detection system according to the conventional technology, capable of detecting attacks at the third or higher layer and in addition, detecting the attacker and limiting services to the attacker.

Also, according to the present invention, provided are an intrusion detection method and system capable of monitoring and managing easily at a central point, many distributed access points, intrusion detection sensors, and a wireless LAN network managed by access points, by using a wireless security management server.

What is claimed is:

1. An intrusion detection sensor detecting an attack against a wireless network including an access point providing wireless communication to one or more wireless terminals,
    the intrusion detection sensor being configured in the wireless network to sense packets between the access point and the one or more wireless terminals and to receive from the access point confirmation information for indicating whether or not the access point has transmitted to a wireless terminal an event packet including critical information on whether or not a wireless connection between the access point and the wireless terminal is established,
    wherein the intrusion detection sensor examines a packet transmitted and received between the access point and the wireless terminal according to a predetermined detection rule, and when an event packet including critical information on whether or not a wireless line connection between the access point and the wireless terminal is established is examined by the intrusion detection sensor, the event packet is examined by additionally using the confirmation information received from the access point for indicating whether or not the access point has transmitted an event packet, so as to determine the validity of the examined event packet according to whether confirmation information that is associated with the examined event packet and indicates that the access point transmitted the examined event packet is received from the access point.

2. The sensor of claim 1, wherein the event packet is any one of an 802.11 disassociation packet, a deauthentication packet, and an extensible authentication protocol (EAP)-failure packet transmitted by the access point to the wireless terminal.

3. The sensor of claim 2, wherein when the access point transmits the event packet to the wireless terminal, the confirmation information is transferred, by transmitting a message or an identical event packet to the intrusion detection sensor.

4. The sensor of claim 3, wherein the confirmation information is transmitted through a secure communication channel between the access point and the intrusion detection sensor.

5. The sensor of claim 4, wherein the secure communication channel is implemented by using any one of an inter access point protocol (IAPP), an Internet protocol security protocol (IPSec), and a transport layer security (TLS) protocol.

6. The sensor of claim 1, wherein the detection rule is used to detect any one of a rogue access point attack, and a man-in-the-middle attack.

7. The sensor of claim 6, wherein the detection rule is used to further detect any one of an address resolution protocol (ARP) poisoning attack, an 802.11i message integrity code (MIC) failure attack, and a denial of service attack using the characteristic of an 802.11f protocol.

8. The sensor of claim 1, wherein the detection rule is transmitted by a wireless security management server monitoring the security situation of distributed networks including a plurality of access points.

9. A wireless network intrusion detection system providing wireless communication to one or more wireless terminal, the system comprising:
    an access point providing wireless communication to the wireless terminal; and
    an intrusion detection sensor examining packets transmitted and received between the access point and a wireless terminal according to a predetermined detection rule,
    wherein the access point transmits confirmation information to the intrusion detection sensor, the confirmation information indicating whether or not an event packet, including critical information on whether or not a wireless line connection between the access point and the wireless terminal is established, is transmitted by the access point and
    wherein the intrusion detection sensor examines an event packet among the packets transmitted and received between the access point and the wireless terminal by additionally using the confirmation information received from the access point and indicating whether or not the access point transmitted the event packet, so as to determine the validity of the event packet according to whether confirmation information that is associated with the examined event packet and indicates that the access point transmitted the examined event packet is received from the access point.

10. The system of claim 9, wherein the event packet is any one of an 802.11 disassociation packet, a deauthentication packet, and an extensible authentication protocol (EAP)-failure packet transmitted by the access point to the wireless terminal.

11. The system of claim 9, wherein when the access point transmits the event packet to the wireless terminal, the confirmation information is transferred, by transmitting a message or the event packet itself to the intrusion detection sensor through a communication channel between the access point and the intrusion detection sensor.

12. The system of claim 11, wherein the confirmation information is transmitted through a secure communication channel between the access point and the intrusion detection sensor.

13. The system of claim 12, wherein the secure communication channel is implemented by using any one of an IAPP, an IPSec, and a TLS protocol.

14. The system of claim 9, wherein the intrusion detection sensor detects any one of a rogue access point attack, and a man-in-the-middle attack, by using the detection rule.

15. The system of claim 9, wherein the access point comprises an intrusion detection module internally, and the intrusion detection module detects any one of an address resolution protocol (ARP) poisoning attack, an 802.11i message integrity code (MIC) failure attack, and a denial of service attack using the characteristic of an 802.11f protocol, by using the detection rule.

16. The system of claim 9, further comprising:
a wireless security management server monitoring the security situation of distributed networks including a plurality of access points, and transmitting the detection rule to each of the intrusion detection sensor and an internal intrusion detection module of the access point.

17. A wireless network intrusion detection method providing wireless communication to one or more wireless terminal, the method comprising:
examining ordinary packets transmitted and received between an access point providing wireless communication to the wireless terminal and the wireless terminal, according to a predetermined detection rule;
identifying an event packet among the ordinary packets that is transmitted and received between the access point and the wireless terminal, the event packet including critical information on whether or not a wireless line connection between the access point and the wireless terminal is established;
if the event packet is identified, receiving confirmation information from the access point indicating whether or not the event packet is transmitted by the access point; and
examining the event packet by using the confirmation information so as to determine the validity of the examined event packet according to whether the confirmation information received from the access point indicates that the access point transmitted the event packet.

18. The method of claim 17, wherein the event packet is any one of an 802.11 disassociation packet, a deauthentication packet, and an extensible authentication protocol (EAP)-failure packet transmitted by the access point to the wireless terminal.

19. The method of claim 18, wherein when the access point transmits the event packet to the wireless terminal, the confirmation information is transferred, by transmitting the intention, or the event packet itself to the intrusion detection sensor.

20. The method of claim 19, wherein the confirmation information is transmitted through a secure communication channel between the access point and the intrusion detection sensor.

21. The method of claim 20, wherein the secure communication channel is implemented by using any one of an IAPP, an IPSec, and a TLS protocol.

22. The method of claim 17, wherein the detection rule is used to detect any one of a rogue access point attack, and a man-in-the-middle attack, by using the detection rule.

23. The method of claim 22, wherein the detection rule is used to detect any one of an address resolution protocol (ARP) poisoning attack, an 802.11i message integrity code (MIC) failure attack, and a denial of service attack using the characteristic of an 802.11f protocol, by using the detection rule.

24. The method of claim 17, wherein the detection rule is transmitted by a wireless security management server monitoring the security situation of distributed networks including a plurality of access points.

* * * * *